United States Patent
Jiang et al.

(10) Patent No.: US 11,523,430 B2
(45) Date of Patent: *Dec. 6, 2022

(54) METHOD OF INFORMATION TRANSMISSION IN UNLICENSED BAND AND NETWORK DEVICE

(71) Applicant: VIVO MOBILE COMMUNICATION CO., LTD., Chang'an Dongguan (CN)

(72) Inventors: Lei Jiang, Chang'an Dongguan (CN); Xueming Pan, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 88 days.

This patent is subject to a terminal disclaimer.

(21) Appl. No.: 16/638,422

(22) PCT Filed: Aug. 8, 2018

(86) PCT No.: PCT/CN2018/099381
§ 371 (c)(1),
(2) Date: Feb. 11, 2020

(87) PCT Pub. No.: WO2019/033971
PCT Pub. Date: Feb. 21, 2019

(65) Prior Publication Data
US 2020/0170039 A1    May 28, 2020

(30) Foreign Application Priority Data
Aug. 17, 2017    (CN) .......................... 201710707138.9

(51) Int. Cl.
*H04W 74/08* (2009.01)
*H04W 16/14* (2009.01)

(52) U.S. Cl.
CPC ....... *H04W 74/0808* (2013.01); *H04W 16/14* (2013.01)

(58) Field of Classification Search
CPC . H04W 74/0808; H04W 16/14; H04W 88/08; H04W 72/085; H04W 16/28; H04W 74/08
See application file for complete search history.

(56) References Cited

U.S. PATENT DOCUMENTS

2008/0117865 A1* 5/2008 Li ..................... H04W 74/0808
370/329
2016/0192395 A1* 6/2016 Yoo ..................... H04B 7/0874
370/329

(Continued)

FOREIGN PATENT DOCUMENTS

| CN | 104507108 A1 | 4/2015 |
|---|---|---|
| WO | WO 2017/026813 A1 | 2/2017 |
| WO | WO 2018/219236 A1 | 12/2018 |

OTHER PUBLICATIONS

European Search Report Application No, 18846888.0; dated Jun. 29, 2020.

(Continued)

*Primary Examiner* — Marcus Hammonds
(74) *Attorney, Agent, or Firm* — von Briesen & Roper, s.c.

(57) ABSTRACT

A method of information transmission in an unlicensed band and a network device are disclosed. The network device includes at least two nodes. The method of information transmission in the unlicensed band includes: listening to a channel in an unlicensed band by a node of the network device, to obtain a channel listening result; transmitting information on the channel by the node in case that the channel listening result indicates that the channel is idle.

17 Claims, 1 Drawing Sheet

(56) References Cited

U.S. PATENT DOCUMENTS

| | | |
|---|---|---|
| 2017/0171887 A1 | 6/2017 | Shi et al. |
| 2018/0235008 A1* | 8/2018 | Park .................... H04W 16/28 |
| 2018/0352577 A1* | 12/2018 | Zhang ............... H04W 74/0816 |
| 2019/0082333 A1 | 3/2019 | Malik et al. |
| 2019/0089443 A1 | 3/2019 | Malik et al. |
| 2019/0166503 A1 | 5/2019 | Ahn et al. |
| 2019/0200389 A1* | 6/2019 | Li ........................ H04B 7/0695 |
| 2019/0230665 A1 | 7/2019 | Lopez-Perez et al. |
| 2019/0306883 A1 | 10/2019 | Shi et al. |
| 2019/0387412 A1 | 12/2019 | Kim et al. |
| 2020/0045735 A1 | 2/2020 | Kim et al. |
| 2020/0059965 A1 | 2/2020 | Mangalvedhe et al. |
| 2020/0099436 A1 | 3/2020 | Malik et al. |
| 2020/0163117 A1* | 5/2020 | Jiang .................. H04W 72/046 |

OTHER PUBLICATIONS

International Search Report & Written Opinion related to Application No. PCT/CN2018/099381; dated Sep. 30, 2018.

Huawei, Hisilicon; "Coexistence and channel access for NR-based unlicensed band operation"; 3GPP TSG RAN WG1 NR Ad Hoc Meeting, R1-1711467, Qingdao, China Jun. 27, 2017-Jun. 30, 2017.

Huawei, Hisilicon; "Remaining LBT parameters for LAA DL"; 3GPP TSG RAN WG1 83 Meeting, R1-156914, Anaheim, USA, Nov. 15, 2015-Nov. 22, 2015.

LG Electronics; "Energy detection threshold in LAA"; 3GPP TSG RAN WG1 meeting #82bis, R1-155385, Malmo, Sweden, Oct. 5, 2015-Oct. 9, 2015.

Huawei, Hisilicon, "High level consideration on NR unlicensed band operation"; 3GPP TSG RAN WG1 Meeting #90, R1-1713782, Prague, Czech Republic, Aug. 21, 2017-Aug. 25, 2017.

Non-Final Office Action for related U.S. Appl. No. 16/635,507; dated Apr. 27, 2021.

* cited by examiner

METHOD OF INFORMATION TRANSMISSION IN UNLICENSED BAND AND NETWORK DEVICE

CROSS-REFERENCE TO RELATED APPLICATION

The present application is the U.S. national phase of PCT Application No.PCT/CN2018/099381 filed on Aug. 8, 2018, which claims a priority of the Chinese patent application No. 201710707138.9 filed in China on Aug. 17, 2017, disclosures of which are incorporated herein by reference in their entireties.

TECHNICAL FIELD

The present disclosure relates to the field of communication technology, in particular to a method of information transmission in an unlicensed band and a network device.

BACKGROUND

In New Radio (NR) systems, unlicensed band is conducive to operator's service expansion effort by serving as a supplement to the licensed band. To be in line with the NR system deployment and maximize NR system-based unlicensed access, the unlicensed band may operate in 5 GHz, 37 GHz and 60 GHz bands. The large bandwidth (80 MHz or 100 MHz) of the unlicensed band may reduce implementation complexities of network device and User Equipment (UE). Due to the fact that the unlicensed band is shared by multiple Radio Access Technologies (RATS) such as Wireless Fidelity (Win.), radar, and Long Term Evolution License Assisted Access (LTE-LAA), in some countries or regions, the usage of unlicensed band has to comply with certain regulations such as Listen Before Talk (LBT), and Maximum Channel Occupancy Time (MCOT), to ensure a fair resource sharing among all equipment.

In NR systems, to enable a downlink transmission rate of 20 Gbps and an uplink transmission rate of 10 Gbps, high frequency communication and massive Multiple Input Multiple Output (MIMO) techniques are introduced. The high frequency, communication may provide larger system bandwidth and allow for smaller antenna size, thereby facilitating the deployment of massive MIMO in the network device and the UE. A massive MIMO antenna is made up of multiple antenna planes. Each antenna plane may be considered as a Transmission and Reception Point (TRP) or node. When a multiple-antenna base station accesses unlicensed band, each TRP has to comply with an access rule for the unlicensed band. However, in related art, LBT is directed to a whole base station, thus it is impossible to determine channel state in an unlicensed band accurately.

SUMMARY

Embodiments of the present disclosure provide a method of information transmission in an unlicensed band and a network device.

In a first aspect, an embodiment of the present disclosure provides a method of information transmission in an unlicensed band, the method of information transmission is applied to a network device including at least two nodes, and includes: listening to a channel in the unlicensed band by the node of the network device, to obtain a channel listening result; transmitting information on the channel by the node in case that the channel listening result indicates that the channel is idle.

In a second aspect, an embodiment of the present disclosure further provides a network device, including: at least two nodes; a listening module, configured to listen to the channel in a unlicensed band by a node of the network device, to obtain a channel listening result; a transmission module, configured to transmit information on the channel by the node in case that the channel listening result indicates that the channel is idle.

In a third aspect, an embodiment of the present disclosure provides a network device, including a processor, a memory and a computer program stored in the memory and configured to be executed by the processor, wherein the processor is configured to execute the computer program, to implement steps of the foregoing method of information transmission in the unlicensed band.

In a fourth aspect, an embodiment of the present disclosure provides a computer readable storage medium storing therein a computer program, wherein the computer program is configured to be executed by a processor, to implement steps of the foregoing method of information transmission in an unlicensed band.

BRIEF DESCRIPTION OF THE DRAWINGS

In order to illustrate the technical solutions of embodiments of the present disclosure in a clearer manner, the drawings desired for the embodiments of the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Hereinafter, the exemplary embodiments of the present disclosure are described in detail with reference to the accompanying drawings. Although the exemplary embodiments of the present disclosure are illustrated in the accompanying drawings, the disclosure may, however, be embodied in many different forms and should not be construed as being limited to the embodiments set forth herein. Rather, these embodiments are provided so that the present disclosure will be thorough, and will fully convey the scope of the present disclosure to a person skilled in the art.

Terms "first", "second" and the like in the description and claims of this application are adopted not to describe a specific sequence or order but to distinguish similar objects. It should be understood that data used like this may be interchanged under a proper condition for implementation of the embodiments of the disclosure described herein in a sequence apart from those shown or described herein. In addition, terms "include" and "have" and any variant thereof are intended to cover nonexclusive inclusions. For example, a process, method, system, product or device including a series of steps or units is not limited to those steps or units which are clearly listed, but may include other steps or units which are not clearly listed or intrinsic to the process, the method, the product or the device.

Figure 1:
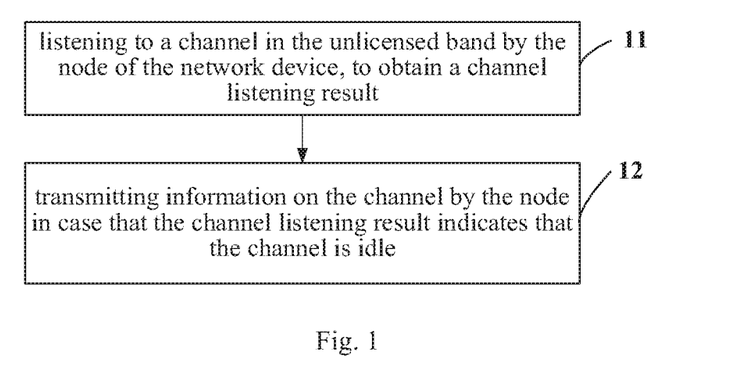
FIG. 1 illustrates a schematic flow diagram of a method of information transmission in an unlicensed band according to an embodiment of the present disclosure.

An embodiment of the present disclosure provides a method of information transmission in an unlicensed band, which is applied to network device including at least two nodes. As shown in FIG. 1, the method includes specifically following steps.

Step 11: listening to a channel in the unlicensed band by the node of the network device, to obtain a channel listening result.

The network device includes at least two nodes. When it is required to transmit information by a network node, the information is in effect transmitted by the node of the network device. When information is transmitted by using a channel in an unlicensed band, in order to prevent an access failure of node, a channel in the unlicensed band is listened to by means of the node, according to the embodiment of the present disclosure, to obtain a channel listening result about the channel.

Step 12: transmitting information on the channel by the node in case that the channel listening result indicates that the channel is idle.

Particularly, when a certain node listened that the channel is idle, information is transmitted on the channel by the node; and when multiple nodes listened that the channel is idle, information may be transmitted on the channel by the multiple nodes.

Since the network device includes at least two nodes, the listening to the channel in the unlicensed band by means of a node may specifically be achieved in two modes as follows: listening by each node independently, and listening by the multiple nodes jointly. Hereinafter, the method of information transmission in the unlicensed band according to an embodiment of the present disclosure is further described in connection with these two modes.

Mode 1: each node of the network device listens to the channel independently.

The step 11 includes specifically: listening to the channel in the unlicensed band by the at least two nodes of the network device respectively, to obtain the channel listening result.

The channel in the unlicensed band is listened to according to respective listening parameter sets of the at least two nodes of the network device respectively to obtain the channel listening result. Each node of the network device is provided with an independent listening parameter set (also called LIST parameter set) of its own, and the nodes listen to the channel in the unlicensed band according to respective listening parameter sets to obtain corresponding channel listening results. When the channel listening result indicates that the channel is idle, information may be transmitted on the channel by the node. The listening parameter set includes at least one of information of a listening start time, information of a listening slot duration for Clear Channel Assessment/enhance Clear Channel Assessment (CCA/eCCA), information of a defer duration, information of a transmission start time, information of a contention window, and information of a backoff counter. Since the listening parameter sets of the nodes are different from each other, and to-be-transmitted pieces of information arrive at different times, the nodes may start to listen to the channel at different times.

In specific, the listening process may be implemented with following steps: detecting a total power of a signal on the channel in the unlicensed band by the node of the network device; obtaining a channel listening result indicating that the channel is idle in case that the detected total power of the signal on the channel is below a first threshold; obtaining a channel listening result indicating that the channel is in an occupied state in case that the detected total power of the signal on the channel is above the first threshold. When the node detects that the channel is idle, information may be transmitted on the channel by the node directly.

It should be appreciated that, the foregoing mode is based on power detection. To prevent an interference between nodes of the network device itself, the listening may be performed based on both a power detection and an additional signal detection according to embodiments of the present disclosure. In other words, when a detected total signal power of the channel is above a first threshold, it does not necessarily lead to a channel listening result indicating that the channel is in an occupied state; rather, an additional signal detection is further performed, to prevent a problem that a node that listens to the transmission at an early time may hinder a node that listens to the transmission at a late time due to different listening end times of the nodes of the network device.

Specifically, the additional signal detection may be implemented with following steps: detecting a total power of a signal on the channel in the unlicensed band by the node of the network device; obtaining a channel listening result indicating that the channel is idle in case that the detected total power of the signal on the channel is below a first threshold; detecting a total power of a signal of a neighboring node on the channel in case that the detected total power of the signal on the channel is above the first threshold; obtaining a channel listening result indicating that the channel is idle in case that a difference between the total power of the signal on the channel and the total power of the signal of the neighboring node on the channel is below a second threshold; obtaining a channel listening result indicating that the channel is in an occupied state in case that the difference between the total power of the signal on the channel and the total power of the signal of the neighboring node on the channel is above the second threshold.

It should be appreciated that, the neighboring node and the listening node herein belong to the same network device, and the second threshold herein may or may not be the same as the foregoing first threshold.

In particular, the step of detecting a total power of a signal of a neighboring node on the channel includes: acquiring a transmission position of the signal of the neighboring node on the channel; detecting the total power of the signal of the neighboring node at the corresponding transmission position. That is, while performing the CCA/eCCA, each node performs an additional signal detection at corresponding transmission position. The additional signal may be at least one of following signals of a neighboring node: a control signal in a Physical Downlink Control Channel (PDCCH), a Channel State Information Reference Signal (CSI-RS), a Demodulation Reference Signal (DMRS), a Tracking Reference Signal (TRS), and the like. The network device should notify each node of the additional signals to be detected and possible transmission positions of the respective additional signals when it is detected that the channel is in the occupied state. When it is detected that a difference between the total power of the signal on the channel and the total power of the signal of the neighboring node on the channel is below the second threshold, it determines that the channel is occupied by another node of the network device. As a result, the channel may be determined as being idle, and the listening node may transmit information on the channel.

Mode 2: multiple nodes of the network device listen to the channel jointly.

The step 11 includes specifically: listening to the channel in the unlicensed band by the at least two nodes of the network device jointly to obtain the channel listening result. The at least two nodes are all nodes of the network device, or nodes of the network device that are required to transmit information. The nodes performing the listening jointly are required to start performing LBT at the same time, that is, in the joint listening process, the at least two nodes start listening at the same time. In specific, the channel in the unlicensed band is listened to by the at least two nodes of the network device jointly at a same time to obtain the channel listening result. The listening start time may be informed by the network device to each node which is required to listen.

Further, the joint listening mode may further be divided into following modes: a mode that the at least two nodes use a same listening parameter set to perform listening, and a mode that the at least two nodes use different listening parameter sets to perform listening. In other words, the channel in the unlicensed band is listened to by the at least two nodes jointly according to respective listening parameter sets of the at least two nodes to obtain the channel listening result; or, the channel in the unlicensed band is listened to by the at least two nodes jointly according to a common listening parameter set of the at least two nodes to obtain the channel listening result.

Before the step of joint listening, the method further includes: acquiring the listening parameter sets of the at least two nodes of the network device; wherein the listening parameter set include at least one of: information of a listening start time, information of a listening slot duration for CCA/eCCA, information of a defer duration, information of a transmission start time, information of a contention window, and information of a backoff counter. For the joint listening using the same listening parameter set, each node starts listening to the channel at the same time according to parameters in the listening parameter set. In case of a one-shot LBT, each node performs listening for once according to CCA slot duration, and the node may transmit information in the case of detecting that the channel is idle. In case of a cat4 LBT, when an initial CCA of any node detects that the channel is busy, the network device creates randomly a backoff counter N according to a size of a contention window. All nodes continue to perform an eCCA. A TRP whose counter N value is zero may transmit information.

In the joint listening mode, the at least two nodes include a first node. The step 12 includes specifically: after a completion of listening by all of the at least two nodes, transmitting information on a first channel by the first node in case that a channel listening result of the first node indicates that the first channel is idle. In other words, after all nodes performing the joint listening finish the listening process, the nodes start transmitting information at the same time, so as to prevent the interference between the nodes. Specifically, a node finishing listening earlier may perform a self-deferral to ensure that the nodes start information transmission at the same time. Specifically, the first node is indicated to perform a self-deferral after the first node finishes listening and before the first node transmits information on the first channel.

Alternatively, to eliminate an unnecessary waiting time wasted on the self-deferral, the step 12 may include: after a completion of listening by the first node, transmitting information on the first channel by the first node in case that the channel listening result of the first node indicates that the first channel is idle. That is, each node participating in the joint listening may transmit information as soon as it detects that the channel is idle, without waiting until all other nodes participating in the joint listening finish listening. To prevent the interference between the nodes, the additional signal detection may further be performed. In specific, the additional signal detection may be implemented with following steps: detecting a total power of a signal on the channel in the unlicensed band by the node of the network device; obtaining a channel listening result indicating that the channel is idle in case that the detected total power of the signal on the channel is below a first threshold; detecting a total power of a signal of a neighboring node on the channel in case that the detected total power of the signal on the channel is above the first threshold; obtaining a channel listening result indicating that the channel is idle in case that a difference between the total power of the signal on the channel and the total power of the signal of the neighboring node on the channel is below a second threshold; obtaining a channel listening result indicating that the channel is in an occupied state in case that the difference between the total power of the signal on the channel and the total power of the signal of the neighboring node on the channel is above the second threshold. Herein, the neighboring node and the listening node belong to the same network device. In specific, the step of detecting a total power of a signal of a neighboring node on the channel includes: acquiring a transmission position of a signal of the neighboring node on the channel; detecting the total power of the signal of the neighboring node at the corresponding transmission position. That is, while performing the CCA/eCCA, each node performs an additional signal detection at corresponding transmission position. The additional signal may be at least one of following signals of a neighboring node: a PDCCH, a CSI-RS, a WARS, a TRS, and the like. The network device should notify each node of the additional signal that is required to be detected and a possible transmission position thereof if it is detected that the channel is in an occupied state. When it is detected that a difference between the total power of the signal on the channel and the total power of the signal of the neighboring node on the channel is below the second threshold, a determination may be made that the channel is occupied by another node of the network device. As a result, the channel may be determined as being idle, and the listening node may transmit information on the channel.

Specifically, the first node transmits information for another node on the first channel in case that the channel listening result of the first node indicates that the first channel is idle and the first node is not required to transmit information. The other node is a node, other than the first node, of the at least two nodes that is required to transmit information. In other words, if a node detecting that a channel is idle is not required to transmit information, there may be no information transmission, or for load balancing, the node may transmit data for another node, particularly the node detecting a busy channel, which is required to transmit information.

Further, the step of transmitting information on the first channel by the first node includes: determining a transmission mode according to the first node; transmitting information on the first channel in the transmission mode. The transmission mode includes at least one of: a Coordinated Scheduling (CS) mode, a Coordinated Beam (CB) forming mode, a Joint Transmission (JT) mode, and a Dynamic Point Selection (DPS) mode. In other words, the network device determines, according to the channel listening result of all the listening nodes, as to which nodes are used for transmission. In addition, a transmission mode may be determined based on all nodes being ready to transmit, i.e., the first node which detects that a channel is idle; the transmission mode is such as a CS mode, or a coordinated CB mode, or a JT mode, or a DPS mode.

According to the method of information transmission in the unlicensed band provided by an embodiment of the present disclosure, a node of network device listens to a channel in the unlicensed band, and accesses the channel when it is detected that the channel is idle. In this way, a state of a channel in the unlicensed band may be acquired accurately, and information transmission in the unlicensed band is enabled, thereby improving an access ratio of node and a resource utilization ratio.

The foregoing examples describe in detail the method of information transmission in the unlicensed band in different scenarios respectively. Hereinafter, corresponding network device is described according to the following embodiment with reference to accompanying drawings.

Figure 2:
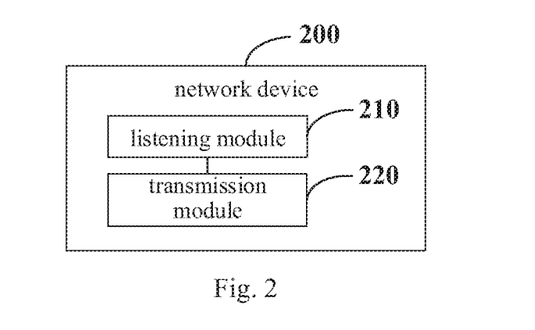
FIG. 2 illustrates a block diagram of a network device according to an embodiment of the present disclosure.

As shown in FIG. 2, an embodiment of the present disclosure provides a network device 200, which may implement details of the method of listening to a channel in the unlicensed band by a node of the network device to obtain a channel listening result, and transmitting information on the channel by the node in case that the channel listening result indicates that the channel is idle according to the foregoing embodiments, and achieve the same effects. The network device 200 includes specifically at least two nodes and the following functional modules: a listening module 210, configured to listen to a channel in a unlicensed band by the node of the network device to obtain a channel listening result; a transmission module 220, configured to transmit information on the channel by the node when the channel listening result indicates that the channel is idle.

The listening module 210 includes: a first listening submodule, configured to listen to the channel in the unlicensed band by the at least two nodes of the network device respectively to obtain the channel listening result.

The first listening submodule includes: a first listening unit, configured to listen to the channel in the unlicensed band according to respective listening parameter sets of the at least two nodes of the network device respectively to obtain the channel listening result; wherein the listening parameter sets include at least one of: information of a listening start time, information of a listening slot duration for CCA/eCCA, information of a defer duration, information of a transmission start time, information of a contention window, and information of a backoff counter.

The listening module 210 further includes: a second listening submodule, configured to listen to the channel in the unlicensed band by the at least two nodes of the network device jointly to obtain the channel listening result.

The second listening submodule includes: a second listening unit, configured to listen to the channel in the unlicensed band by the at least two nodes of the network device jointly at a same time to obtain the channel listening result; wherein the at least two nodes are all nodes of the network device, or nodes of the network device that are required to transmit information.

The second listening submodule includes: a third listening unit, configured to listen to the channel in the unlicensed band by the at least two nodes jointly according to respective listening parameter sets of the at least two nodes to obtain the channel listening result; or, a fourth listening unit, configured to listen to the channel in the unlicensed band by the at least two nodes jointly according to a common listening parameter set of the at least two nodes to obtain the channel listening result.

The network device 200 further includes: an acquisition module, configured to acquire the listening parameter sets of the at least two nodes of the network device; wherein the listening parameter set include at least one of: information of a listening start time, information of a listening slot duration for CCA/eCCA, information of a defer duration, information of a transmission start time, information of a contention window, and information of a backoff counter.

The at least two nodes include a first node; and the transmission module 220 includes: a first transmission submodule, configured to, after a completion of listening by all of the at least two nodes, transmit information on a first channel by the first node in case that a channel listening result of the first node indicates that the first channel is idle; or a second transmission submodule, configured to, after a completion of listening by the first node, transmit information on the first channel by the first node in case that the channel listening result of the first node indicates that the first channel is idle.

The transmission module 220 further includes: an indication module, configured to indicate the first node to perform a self-deferral after a completion of listening by the first node and before transmitting information on the first channel by the first node.

The transmission module 220 further includes: a third transmission submodule, configured to transmit information of another node on the first channel by the first node in case that the channel listening result of the first node indicates that the first channel is idle and the first node is not required to transmit information; wherein the other node is a node of the at least two nodes other than the first node, and is required to transmit information.

The transmission module 220 includes: a determination submodule, configured to determine a transmission mode according to the first node, wherein the transmission mode comprises at least one of: a CS mode, a CB forming mode, a JT mode, and a DPS mode; a fourth transmission submodule, configured to transmit information on the first channel according to the transmission mode.

The listening module 210 further includes: a third listening submodule, configured to detect a total power of a signal on the channel in the unlicensed band by the node of the network device; a first processing submodule, configured to obtain a channel listening result indicating that the channel is idle in the case that the detected total power of the signal on the channel is below a first threshold; a second processing submodule, configured to obtain a channel listening result indicating that the channel is in an occupied state in the case that the detected total power of the signal on the channel is above the first threshold.

The listening module 210 further includes: a fourth listening submodule, configured to detect a total power of a signal on the channel in the unlicensed band by the node of the network device; a third processing submodule, configured to obtain a channel listening result indicating that the channel is idle when the detected total power of the signal on the channel is below a first threshold; a detection submodule, configured to detect a total power of a signal of a neighboring node on the channel in case that the detected total power of the signal on the channel is above the first threshold; a fourth processing submodule, configured to obtain the channel listening result indicating that the channel is idle in case that a difference between the total power of the signal on the channel and the total power of the signal of the neighboring node on the channel is below a second threshold; a fifth processing submodule, configured to obtain the channel listening result indicating that the channel is in an occupied state in case that the difference between the total power of the signal on the channel and the total power of the signal of the neighboring node on the channel is above the second threshold.

The detection submodule includes: a second acquisition unit, configured to acquire a transmission position of the signal of the neighboring node on the channel; a detection unit, configured to detect the total power of the signal of the neighboring node at the transmission position.

A signal of the neighboring node includes at least one of: a control signal in a PDCCH, a CSI-RS, a DMRS, and a TRS.

It should be appreciated that, the network device according to the embodiment of the present disclosure listens to a channel in the unlicensed band by a node of its own, and accesses the channel when it is detected that the channel is idle. In this way, a state of a channel in the unlicensed band may be acquired accurately, and information transmission in the unlicensed band is enabled, thereby improving an access ratio of node and a resource utilization ratio.

In order to achieve the aforementioned goal in a better manner, an embodiment of the present disclosure further provides network device. The network device includes a processor, a memory and a computer program stored in the memory and configured to be executed by the processor, wherein the processor is configured to execute the computer program, to implement steps of the foregoing method of information transmission in the unlicensed band. An embodiment of the present disclosure farther provides a computer readable storage medium storing therein a computer program, wherein the computer program is configured to be executed by a processor, to implement steps of the foregoing method of information transmission in the unlicensed band.

Figure 3:
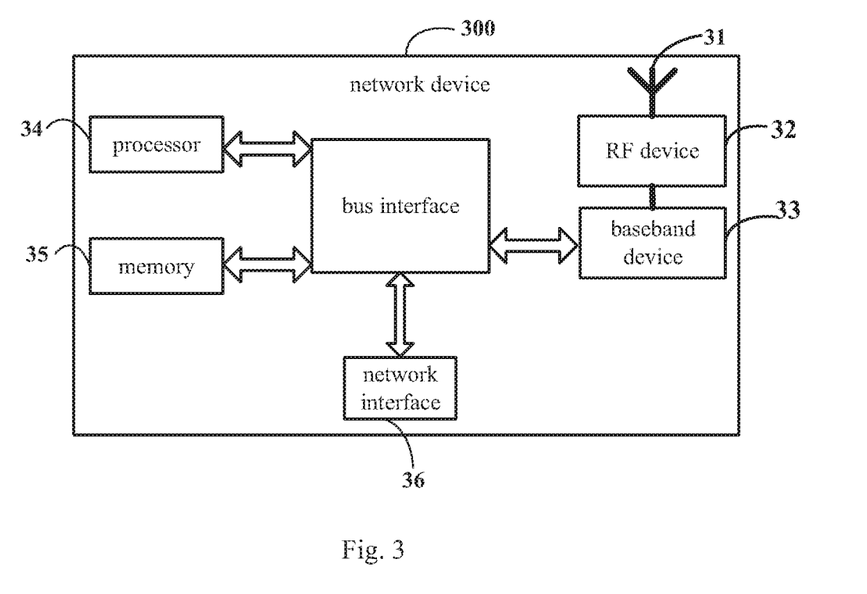
FIG. 3 illustrates a block diagram of a network device according to an embodiment of the present disclosure.

Specifically, the embodiment of the present disclosure further provides network device. As shown in FIG. 3, the network device 300 includes: an antenna 31, a Radio Frequency (RF) device 32, and a baseband device 33. The antenna 31 is connected to the RF device 32. In an uplink direction, the RF device 32 receives information through the antenna 31, and transmits the received information to the baseband device 33 for processing. In a downlink direction, the baseband device 33 processes information to be transmitted, and transmits the information to the RF device 32. The RF device 32 processes the received information and transmits the processed information via the antenna 31.

The foregoing frequency band processing device may be located in the baseband device 33. The method performed by the network device in the foregoing embodiments may be implemented in the baseband device 33. The baseband device 33 includes a processor 34 and a memory 35.

The baseband device 33 may include, for example, at least one baseband board. A plurality of chips are disposed on the baseband board. As shown in FIG. 3, one of the chips is, for example, the processor 34, and the processor 34 is connected to the memory 35, to call a program in the memory 35, to perform the operations of the network device as described in the foregoing method embodiments.

The baseband device 33 may further include a network interface 36 configured to exchange information with the RF device 32. The interface is, for example, a Common Public Radio Interface (CPRI).

The processor herein may be one processor or refer to multiple processing elements collectively. For example, the processor may be a Central Processing Unit (CPU), or may be an Application Specific Integrated Circuit (ASIC), or one or more Integrated Circuits (ICs) configured to implement the method performed by the network device, such as one or more Digital Signal Processors (DSPs), or one or more Field Programmable Gate Arrays (FPGAs). The memory element may be one memory or may refer to multiple memory elements collectively.

The memory 35 may be a volatile memory or a non-volatile memory or may include both a volatile memory and a non-volatile memory. The non-volatile memory may be a Read-Only Memory (ROM), a Programmable Read Only Memory (PROM), an Erasable Programmable Read Only Memory (EPROM), an Electrically Erasable Programmable Read Only Memory (EEPROM) or flash memory. The volatile memory may be a Random Access Memory (RAM) that acts as an external cache. By way of example and not limitation, many forms of RAMs may be used, such as a Static Random Access Memory (SRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a Synchlink Dynamic Random Access Memory (SLDRAM) and a Direct Rambus Random Access Memory (DRRAM). The memory 35 described in the present application is intended to include, without being limited to, these and any other suitable types of memories.

Specifically, the network device according to the embodiment of the present disclosure further includes: a computer program stored in the memory 35 and configured to be executed by the processor 34. The processor 34 is configured to call the computer program in the memory 35 to implement the method performed by various modules as shown in FIG. 2.

Specifically, the processor 34 is configured to call the computer program to implement following steps: listening to a channel in the unlicensed band by a node of the network device, to obtain a channel listening result; transmitting information on the channel by the node in case that the channel listening result indicates that the channel is idle.

Specifically, the processor 34 is configured to call the computer program to implement following step: listening to the channel in the unlicensed band by the at least two nodes of the network device respectively, to obtain the channel listening result.

Specifically, the processor 34 is configured to call the computer program to implement following step: listening to the channel in the unlicensed band according to respective listening parameter sets of the at least two nodes of the network device respectively, to obtain the channel listening result; wherein the listening parameter set comprises at least one of: information of a listening start time, information of a listening slot duration for CCA/eCCA, information of a defer duration, information of a transmission start time, information of a contention window, and information of a backoff counter.

Specifically, the processor 34 is configured to call the computer program to implement following step: listening to the channel in the unlicensed band by the at least two nodes of the network device jointly, to obtain the channel listening result.

Specifically, the processor 34 is configured to call the computer program to implement following step: listening to the channel in the unlicensed band by the at least two nodes of the network device jointly at a same time to obtain the channel listening result; wherein the at least two nodes are all nodes of the network device, or nodes of the network device that are required to transmit information.

Specifically, the processor 34 is configured to call the computer program to implement following step: listening to the channel in the unlicensed band by the at least two nodes jointly according to respective listening parameter sets of the at least two nodes, to obtain the channel listening result; or listening to the channel in the unlicensed band by the at least two nodes jointly according to a common listening parameter set of the at least two nodes, to obtain the channel listening result.

Specifically, the processor 34 is configured to call the computer program to implement following step: acquiring the listening parameter sets of the at least two nodes of the network device; wherein the listening parameter set comprises at least one of: information of a listening start time, information of a listening slot duration for CCA/eCCA, information of a defer duration, information of a transmission start time, information of a contention window, and information of a backoff counter.

Specifically, the at least two nodes include a first node; the processor 34 is configured to call the computer program to implement following step: after a completion of listening by all of the at least two nodes, transmitting information on a first channel by the first node in case that a channel listening result of the first node indicates that the first channel is idle; or after a completion of listening by the first node, transmitting information on the first channel by the first node in case that the channel listening result of the first node indicates that the first channel is idle.

Specifically, the processor 34 is configured to call the computer program to implement following step: indicating the first node to perform a self-deferral after a completion of listening by the first node and before transmitting information on the first channel by the first node.

Specifically, the processor 34 is configured to call the computer program to implement following step: transmitting information of another node on the first channel by the first node in case that the channel listening result of the first node indicates that the first channel is idle and the first node is not required to transmit information; wherein the other node is a node of the at least two nodes other than the first node, and is required to transmit information.

Specifically, the processor 34 is configured to call the computer program to implement following steps: determining a transmission mode according to the first node; wherein, the transmission mode includes at least one of: a CS mode, a CB forming mode, a JT mode, and a DPS mode; transmitting information on the first channel according to the transmission mode.

Specifically, the processor 34 is configured to call the computer program to implement following steps: detecting a total power of a signal on the channel in the unlicensed band by the node of the network device; obtaining the channel listening result indicating that the channel is idle in case that the detected total power of the signal on the channel is below a first threshold; obtaining the channel listening result indicating that the channel is in an occupied state in case that the detected total power of the signal on the channel is above the first threshold.

Specifically, the processor 34 is configured to call the computer program to implement following steps: detecting a total power of a signal on the channel in the unlicensed band by the node of the network device; obtaining a channel listening result indicating that the channel is idle in case that the detected total power of the signal on the channel is below a first threshold; detecting a total power of a signal of a neighboring node on the channel in case that the detected total power of the signal on the channel is above the first threshold; obtaining the channel listening result indicating that the channel is idle in case that a difference between the total power of the signal on the channel and the total power of the signal of the neighboring node on the channel is below a second threshold; obtaining the channel listening result indicating that the channel is in an occupied state in case that the difference between the total power of the signal on the channel and the total power of the signal of the neighboring node on the channel is above the second threshold.

Specifically, the processor 34 is configured to call the computer program to implement following steps: acquiring a transmission position of the signal of the neighboring node on the channel; detecting the total power of the signal of the neighboring node at the transmission position.

A signal of the neighboring node includes at least one of: a control signal in a PDCCH, a CSI-RS, a DMRS or a TRS.

The network device may be a Base Transceiver Station (BTS) of a Global System for Mobile communications (GSM) or Code Division Multiple Access (CDMA) system, a NodeB (NB) of Wideband Code Division Multiple Access (WCDMA), an evolutional Node B (eNB or eNodeB) of Long Term Evolution (LTE), a relay station or an access point, a next generation NodeB (gNB) in a future fifth Generation (5G) network or the like, which is not limited herein.

The network device according to the embodiment of the present disclosure listens to a channel in the unlicensed band by a node of its own and accesses the channel when it is detected that the channel is idle. In this way, a state of a channel in the unlicensed band may be acquired accurately, and information transmission in the unlicensed band is enabled, thereby improving an access ratio of node and a resource utilization ratio.

A person skilled in the art may be aware that, the exemplary units and algorithm steps described in connection with the embodiments disclosed in the present disclosure may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for ease of description and conciseness, for a detailed working process of the foregoing system, device, and unit, reference may be made to a corresponding process in the foregoing method embodiments, and details are not described herein again.

In the embodiments provided by the present application, it should be understood that the disclosed device and method may be implemented in other manners. The device embodiments described above are merely illustrative. For example, the division of the units is merely a logical function division. In actual implementations, there may be another division manner. For example, multiple units or components may be combined, or may be integrated into another system, or some features may be ignored or not executed. In addition, the displayed or discussed mutual couplings or direct couplings or communication connections may be implemented through some interfaces. The indirect couplings or communication connections between the devices or units may be implemented in electric, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units may be integrated into one unit.

If the functions are implemented in form of software functional units and sold or used as an independent product, the functions may be stored in a computer-readable storage medium. Based on such an understanding, the technical solutions of the present disclosure essentially, or the part contributing to the prior art, or a part of the technical solutions may be implemented in form of a software product. The software product is stored in a storage medium, and includes several instructions for instructing a computer device (which may be, e.g., a personal computer, a server, or a network device) to perform all or a part of the steps of the methods described in the embodiments of the disclosure. The foregoing storage medium includes any medium that can store program code, such as a Universal Serial Bus (USB) flash drive, a removable hard disk, an ROM, an RAM, a magnetic disk, or an optical disc.

In addition, it should be noted that in the device and the method of the present disclosure, apparently, parts or steps may be divided and/or re-combined. The divisions and/or re-combinations should be regarded as equivalent solutions of the present disclosure. Moreover, steps of the above series of processes may be performed naturally in a time order of description. However, the performing sequence is not limited to the time order. Some steps may be performed in parallel or independently. A person skilled in the art would appreciate that all or any steps or parts of the methods and devices of the present disclosure may be implemented in any computing device (including a processor, a storage medium or the like) or a network of computing devices in hardware, firmware, software or a combination thereof, and this can be achieved by a person skilled in the art by using their basic programming skill after reading the description of the present disclosure.

Thus, the object of the present disclosure may also be implemented by running a program or a set of programs on any computing device. The computing device may be a known general purpose device. Thus, the object of the present disclosure may also be implemented merely by providing a program product which contains program code for implementing the methods or devices. That is, such program product also constitutes the present disclosure, and a storage medium in which such a program product is stored also constitutes the present disclosure. Apparently, the storage medium may be any known storage medium or any storage medium that will be developed in the future. It should also be noted that, in the devices and methods of the present disclosure, apparently, parts or steps may be divided and/or re-combined. The divisions and/or re-combinations should be regarded as equivalent solutions of the present disclosure. Moreover, steps of the foregoing series of processes may be performed naturally in a time order of description, however the performing sequence is not limited to the time order. Some steps may be performed in parallel or independently.

The foregoing describes preferred implementations of the present disclosure. It should be noted that for a person skilled in the art, improvements and modifications may farther be made without departing from the principle of the present disclosure. These improvements and modifications should also be deemed as falling within the scope of the present disclosure.

What is claimed is:

1. A method of information transmission in an unlicensed band, wherein the method of information transmission is applied to a network device comprising at least two nodes, each of the nodes is a Transmission and Reception Point (TRP), and the method of information transmission comprises:

listening to a channel in the unlicensed band by the nodes of the network device, to obtain a channel listening result;

transmitting information on the channel by the nodes in case that the channel listening result indicates that the channel is idle, wherein the at least two nodes comprise a first node;

transmitting information on the channel by the nodes in case that the channel listening result indicates that the channel is idle comprises:

after a completion of listening by all of the at least two nodes, transmitting information on a first channel by the first node in case that a channel listening result of the first node indicates that the first channel is idle, wherein transmitting information on the first channel by the first node in case that the channel listening result of the first node indicates that the first channel is idle comprises:

transmitting information of another node on the first channel by the first node in case that the channel listening result of the first node indicates that the first channel is idle and the first node is not required to transmit information, wherein the other node is a node of the at least two nodes other than the first node, and is required to transmit information.

2. The method of information transmission in the unlicensed band according to claim 1, wherein listening to the channel in the unlicensed band by the nodes of the network device to obtain the channel listening result comprises:

listening to the channel in the unlicensed band by the at least two nodes of the network device respectively, to obtain the channel listening result.

3. The method of information transmission in the unlicensed band according to claim 2, wherein listening to the channel in the unlicensed band by the at least two nodes of the network device respectively to obtain the channel listening result comprises:

listening to the channel in the unlicensed band according to respective listening parameter sets of the at least two nodes of the network device respectively, to obtain the channel listening result, wherein the listening parameter set comprises at least one of: information of a listening start time, information of a listening slot duration for Clear Channel Assessment/enhance Clear Channel Assessment (CCA/eCCA), information of a defer duration, information of a transmission start time, information of a contention window, and information of a backoff counter.

4. The method of information transmission in the unlicensed band according to claim 1, wherein listening to the channel in the unlicensed band by the nodes of the network device to obtain the channel listening result comprises:

listening to the channel in the unlicensed band by the at least two nodes of the network device jointly, to obtain the channel listening result.

5. The method of information transmission in the unlicensed band according to claim 4, wherein listening to the channel in the unlicensed band by the at least two nodes of the network device jointly to obtain the channel listening result comprises:
   listening to the channel in the unlicensed band by the at least two nodes of the network device jointly at a same time, to obtain the channel listening result,
   wherein the at least two nodes are all nodes of the network device, or nodes of the network device that are required to transmit information.

6. The method of information transmission in the unlicensed band according to claim 5, wherein listening to the channel in the unlicensed hand by the at least two nodes of the network device jointly to obtain the channel listening result comprises:
   listening to the channel in the unlicensed band by the at least two nodes jointly, according to respective listening parameter sets of the at least two nodes, to obtain the channel listening result; or
   listening to the channel in the unlicensed band by the at least two nodes jointly, according to a common listening parameter set of the at least two nodes, to obtain the channel listening result.

7. The method of information transmission in the unlicensed band according to claim 6, wherein prior to listening to the channel in the unlicensed hand by the at least two nodes of the network device jointly to obtain the channel listening result, the method of information transmission further comprises:
   acquiring the listening parameter sets of the at least two nodes of the network device, wherein the listening parameter set comprises at least one of: information of a listening start time, information of a listening slot duration for CCA/eCCA, information of a defer duration, information of a transmission start time, information of a contention window, and information of a backoff counter.

8. The method of information transmission in the unlicensed band according to claim 1, wherein prior to transmitting information on the first channel by the first node, the method of information transmission further comprises:
   indicating the first node to perform a self-deferral after a completion of listening by, the first node and before transmitting information on the first channel by the first node.

9. The method of information transmission in the unlicensed band according to claim 1, wherein the listening to the channel in the unlicensed band by the nodes of the network device to obtain the channel listening result comprises:
   detecting a total power of a signal on the channel in the unlicensed band by the nodes of the network device;
   obtaining the channel listening result indicating that the channel is idle in case that the detected total power of the signal on the channel is below a first threshold;
   obtaining the channel listening result indicating that the channel is in an occupied state in case that the detected total power of the signal on the channel is above the first threshold.

10. The method of information transmission in the unlicensed band according to claim 1, wherein the listening to the channel in the unlicensed band by the nodes of the network device to obtain the channel listening result further comprises:
    detecting a total power of a signal on the channel in the unlicensed band by the nodes of the network device;
    obtaining a channel listening result indicating that the channel is idle in ease that the detected total power of the signal on the channel is below a first threshold;
    detecting a total power of a signal of a neighboring node on the channel in case that the detected total power of the signal on the channel is above the first threshold;
    obtaining the channel listening result indicating that the channel is idle in case that a difference between the total power of the signal on the channel and the total power of the signal of the neighboring node on the channel is below a second threshold;
    obtaining the channel listening result indicating that the channel is in an occupied state in case that the difference between the total power of the signal on the channel and the total power of the signal of the neighboring node on the channel is above the second threshold.

11. The method of information transmission in the unlicensed band according to claim 10, wherein the detecting the total power of the signal of the neighboring node on the channel comprises:
    acquiring a transmission position of the signal of the neighboring node on the channel;
    detecting the total power of the signal of the neighboring node at the transmission position.

12. The method of information transmission in the unlicensed band according to claim 10, wherein the signal of the neighboring node comprises at least one of: a control signal in a Physical Downlink Control Channel (PDCCH), a Channel State Information Reference Signal (CSI-RS), a Demodulation Reference Signal (DMRS), and a Tracking Reference Signal (TRS).

13. A network device, comprising at least two nodes, wherein each of the nodes is a TRP, and comprises a processor, a memory and a computer program stored in the memory and configured to be executed by the processor, wherein the processor is configured to execute the computer program to:
    listen to a channel in an unlicensed band by the nodes of the network device to obtain a channel listening result;
    transmit information on the channel by the nodes in case that the channel listening result indicates that the channel is idle,
    wherein the at least two nodes comprise a first node;
    transmitting information on the channel by the nodes in case that the channel listening result indicates that the channel is idle comprises:
    after a completion of listening by all of the at least two nodes, transmitting information on a first channel by the first node in case that a channel listening result of the first node indicates that the first channel is idle,
    wherein transmitting information on the first channel by the first node in case that the channel listening result of the first node indicates that the first channel is idle comprises:
    transmitting information of another node on the first channel by the first node in case that the channel listening result of the first node indicates that the first channel is idle and the first node is not required to transmit information, wherein the other node is a node of the at least two nodes other than the first node, and is required to transmit information.

14. The network device according to claim 13, wherein the processor is further configured to execute the computer program to:
listen to the channel in the unlicensed band by the at least two nodes of the network device respectively, to obtain the channel listening result.

15. The network device according to claim 14, wherein the processor is further configured to execute the computer program to:
listen to the channel in the unlicensed band according to respective listening parameter sets of the at least two nodes of the network device respectively, to obtain the channel listening result,
wherein the listening parameter set comprises at least one of: information of a listening start time, information of a listening slot duration for CCA/eCCA, information of a defer duration, information of a transmission start time, information of a contention window, and information of a backoff counter.

16. The network device according to claim 13, wherein the processor is further configured to execute the computer program to:
listen to the channel in the unlicensed band by the at least two nodes of the network device jointly, to obtain the channel listening result.

17. The network device according to claim 14, wherein the processor is further configured to execute the computer program to:
listen to the channel in the unlicensed band by the at least two nodes of the network device jointly at a same time, to obtain the channel listening result,
wherein the at least two nodes are all nodes of the network device, or nodes of the network device that are required to transmit information.

* * * * *